June 24, 1930.  L. L. WHITNEY  1,765,516
METHOD OF MAKING SLACK ADJUSTER SCREWS
Filed Dec. 9, 1925
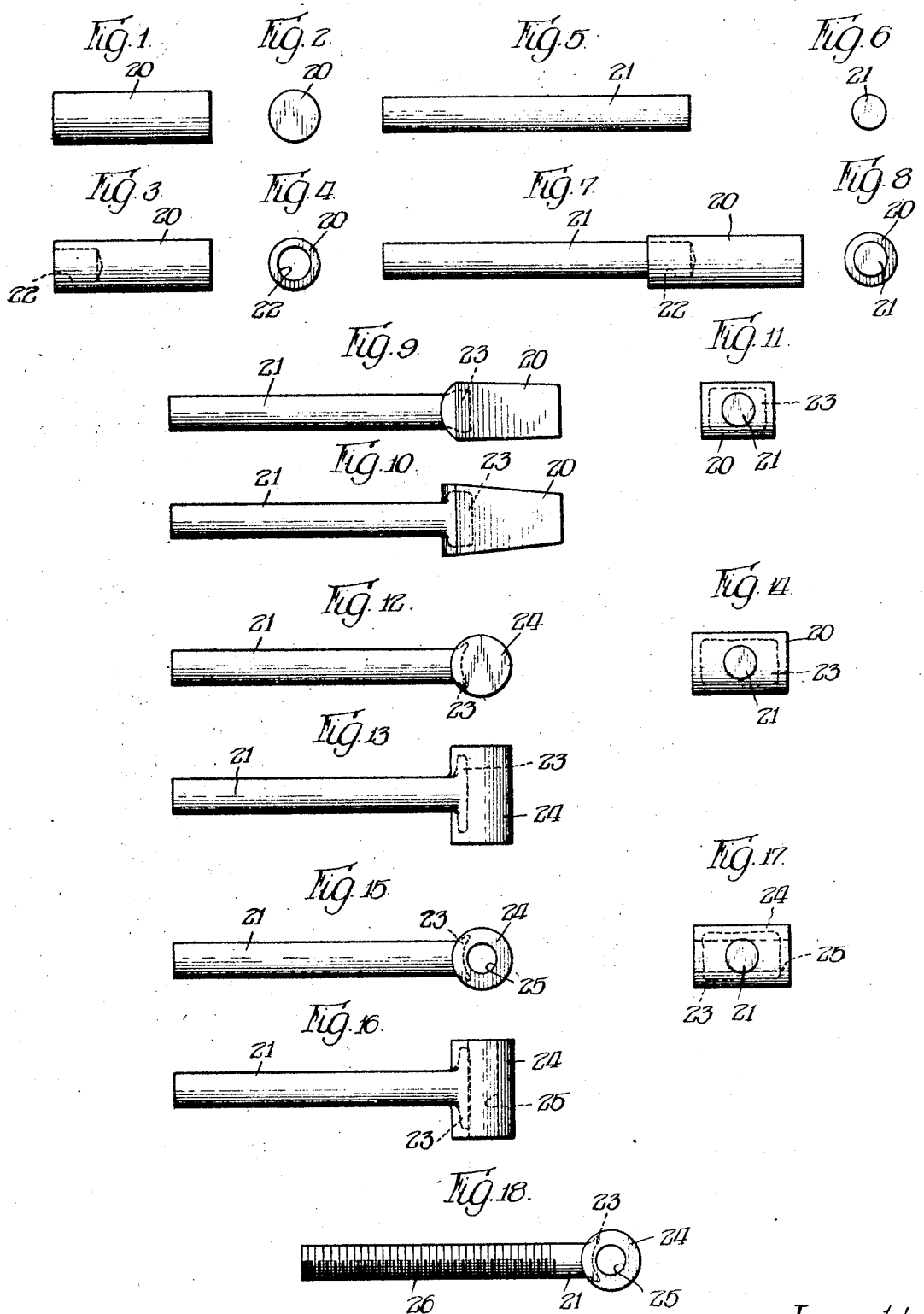

Patented June 24, 1930

1,765,516

UNITED STATES PATENT OFFICE

LOREN L. WHITNEY, OF HAMMOND, INDIANA, ASSIGNOR TO AMERICAN STEEL FOUNDRIES, OF CHICAGO, ILLINOIS, A CORPORATION OF NEW JERSEY

METHOD OF MAKING SLACK ADJUSTER SCREWS

Application filed December 9, 1925. Serial No. 74,261.

This invention relates to a method of making a slack adjuster screw.

Ordinary slack adjuster screws as used in brake mechanism on railway cars, unless properly housed, become corroded and clogged with dirt, making it difficult, if not impossible, to readily adjust the screws. Clearance conditions in some brake arrangements makes it impossible to use types of slack adjuster screws having a sleeve or housing to protect the threads of the screws. An unprotected stainless iron screw may be used, but such is expensive.

Accordingly, one object of my present invention is to provide a simple and practical method of making a reliable and efficient slack adjuster screw which will require no protecting covering and which at the same time is relatively inexpensive.

This and other objects are accomplished by means of the slack adjuster screw and method of making the slack adjuster screw disclosed on the accompanying sheet of drawings, in which Figures 1 and 2 are side and end elevations respectively of one of the two blanks out of which the slack adjuster screw is formed;

Figures 3 and 4 are respectively side and end views of the same blank after a hole is drilled longitudinally of said blank;

Figures 5 and 6 are respectively side and end views of the second blank out of which the slack adjuster screw is formed;

Figures 7 and 8 are respectively side and end views of the two blanks after being placed one within the other;

Figures 9, 10 and 11 are respectively side, top and end views of the two blanks after the first blank has been upset and the metal of the second blank, which is within the first blank, also has been upset to permanently secure said blanks together;

Figures 12, 13 and 14 are respectively side, top and end views of the blanks after being subjected to a further upsetting or forging operation in which a cylindrical head is formed;

Figures 15, 16 and 17 are respectively side, top and end views of the same after the head has been provided with an attaching opening; and, Figure 18 is a side view of the finished slack adjuster screw after being threaded.

The various novel features of the invention will be apparent from the following description and drawings and will be particularly pointed out in the appended claims.

Referring to the figures of the drawings, it will be noted that the slack adjuster screw is made from two blanks 20 and 21 by a method which will be described hereinafter. Each of the blanks preferably is cylindrical in shape as shown in Figures 1, 2, 5 and 6. The first blank 20 is provided with a hole, pocket or recess 22 which is preferably drilled and/or tapped, if desired, as shown in Figures 3 and 4. One end of the second blank 21 is then placed within the hole 22 in the first blank 20 as shown in Figures 7 and 8. It will be understood that if the hole 22 is tapped, the inserted end of the blank 21 will be threaded into the tapped hole. The blank 20 and the inserted end of blank 21 then connected are heated and then by a forging operation upset and take the form as shown in Figures 9, 10 and 11. In this connection, it will be noted that the blank 20 is of a truncated shape and the inserted end of the blank 21 is uniformly spread out to form an interior head as shown at 23 to permanently secure said blanks together. The blank 20 and the same end of blank 21 are then subjected to another forging or upsetting operation, resulting in a further spreading of the interior head 23 and forming a transversely extending cylindrical head 24 mainly from the metal of the first blank 20. This cylindrical head 24 is then provided with a longitudinally arranged attaching opening 25 which opening is transverse with respect to the blank 21 which latter forms the shank of the adjuster screw. This opening 25 preferably is drilled. The adjuster screw in this condition is shown in Figures 15, 16 and 17. The shank 21 is then provided with screw threads 26 for completing the slack adjuster screw as shown in Figure 18. By this method a simple, reliable and endurable adjuster screw is provided.

The blank 21 which finally is made into the screw threaded part 26 is of stainless iron and the other blank 20 forming the head 23 of the screw is of soft steel. As mentioned above, in some arrangements it is not possible on account of clearance conditions to use a type of slack adjuster having a sleeve or housing to protect the screw part of the adjuster. Accordingly, stainless iron is resorted to, but stainless iron is very expensive. In making a slack adjuster screw in which the head or eye portion is soft steel, the cost of the slack adjuster screw taken as a whole is very materially less than that of a screw made entirely of stainless iron. At the same time, a slack adjuster screw is provided which is adapted to meet all of the requirements under service conditions.

I claim:

1. The method of making a slack adjuster screw having an apertured head which consists in providing two elongated blanks, forming a hole in the end of one of said blanks, then placing the end of the second blank in said hole, then upsetting the first blank and the metal of the second blank which is within said hole to permanently secure said blanks together, then upsetting the first blank again to form a transversely arranged head and to flow the metal of said second blank within said head to form a thin transverse end lying in close proximity to the periphery of said head whereby the head may be centrally drilled without exposing any of the enclosed metal of said second blank.

2. The method of making a slack adjuster screw having an apertured head which consists in providing two blanks, forming a hole in one of said blanks, then placing the end of the second blank in said hole, then upsetting the first blank and the metal of the second blank which is within said hole to permanently secure said blanks together and to form a transversely arranged head and to flow the metal of said second blank within said head to form a transverse end lying in close proximity to the periphery of said head whereby the head may be centrally drilled without exposing any of the enclosed metal of said second blank, and then drilling said head.

3. The method of forming a device of the character described, including partially telescoping a plurality of cylindrical blanks in the direction of their longitudinal axes, upsetting one of said blanks to form a member having attaching portions, the longitudinal axis of said upset member being disposed at an angle to the longitudinal axis of the other blank, and providing attaching means for each portion of said device.

4. The method of forming a slack adjuster screw which includes providing a substantially cylindrical member with an axial opening extending part way into said member, inserting a substantially cylindrical blank into said opening to substantially fill the same, upsetting said member and the portion of the blank within said member to dispose the axis of said member at an angle to the axis of said blank and to secure said member to said blank, and forming an opening entirely through the member longitudinally thereof and independently of said blank.

5. The method of forming an article of manufacture which includes axially disposing a pair of metallic blanks in such a manner that a portion of one of said blanks overlaps the other of said blanks, upsetting one of said blanks and the co-operating portion of the other at the overlap therebetween, said upsetting securing said blanks together and disposing the axis of said upset blank at an angle to the axis of the other blank, and forming only the upset blank with an opening therethrough independent of the other blank.

Signed at Hammond, Indiana, this 4th day of December, 1925.

LOREN L. WHITNEY.